United States Patent [19]
Greene

[11] Patent Number: 5,311,827
[45] Date of Patent: May 17, 1994

[54] LOAD COMPENSATOR FOR SPRING COUNTER-WEIGHTING MECHANISM

[76] Inventor: H. Peter Greene, 31 S. Main St., Schwenksville, Pa. 19473

[21] Appl. No.: 900,489

[22] Filed: Jun. 18, 1992

[51] Int. Cl.$^5$ .......................... A47B 9/00; F16H 27/02
[52] U.S. Cl. .................... 108/147; 74/89.22; 248/297.1
[58] Field of Search .............. 108/144, 147; 74/89.22, 74/506; 248/297.1

[56] References Cited

U.S. PATENT DOCUMENTS

| | | |
|---|---|---|
| 2,168,209 | 7/1937 | Haupt . |
| 2,924,411 | 2/1960 | Rouverol . |
| 3,820,478 | 6/1974 | Bergenthal . |
| 4,130,069 | 12/1978 | Evans et al. ................. 108/144 |
| 4,351,245 | 9/1982 | Laporte . |
| 4,389,228 | 6/1983 | Leunig . |
| 4,684,225 | 8/1987 | Clark et al. . |
| 4,685,648 | 8/1987 | Dobner et al. . |
| 4,760,622 | 8/1988 | Rohrman . |

*Primary Examiner*—Peter M. Cuomo
*Assistant Examiner*—Michael J. Milano
*Attorney, Agent, or Firm*—Michael de Angeli

[57] ABSTRACT

An improved load compensator for a spring counter-weighting mechanism including a snail cam to provide a constant counter-weight force is described. The cam provides a constant torque to a drum on which are wound cables for exerting a constant counter-weighting force. A manually operable device for altering the relative radial positions of the cam and drum varies the amount of the constant counter-weighting force. The cam is rotated with respect to the drum by a spur gear fitting within a ring gear fixed to the drum and rotated by a knob connected to an axle carrying a pinion gear engaging the spur gear.

22 Claims, 4 Drawing Sheets

LOAD COMPENSATOR FOR SPRING COUNTER-WEIGHTING MECHANISM

FIELD OF THE INVENTION

This invention relates to an improved load compensator for a spring counter-weighting mechanism useful in a wide variety of different applications. A particular use of the invention is in connection with counter-weighting a vertically movable desk or table top.

BACKGROUND OF THE INVENTION

The prior art shows numerous mechanisms wherein springs are used to provide a counter-weighting force, to ease the labor of lifting a weight against the force of gravity. See U.S. Pat. No. 3,820,478 to Bergenthal directed to an article support stand for lifting a stack of trays, dishes or the like; U.S. Pat. No. 2,168,209 to Haupt showing a spring counter-weight for lifting the weight of an x-ray apparatus or the like; U.S. Pat. No. 4,760,622 to Rohrman showing a spring counter-weighting system for a window sash or the like; and U.S. Pat. Nos. 4,685,648 to Dobner et al and 4,684,225 to Clark et al relating to spring counter-weight mechanisms and related focusing mechanisms for optical microscopes. Also of interest are Rouverol U.S. Pat. No. 2,924,411 showing a spring support for piping, Leunig U.S. Pat. No. 4,389,228 showing a spring-biased constant tensioning device for maintaining a filter bag assembly in a bag house, and U.S. Pat. No. 4,351,245 to Laporte showing a spring counter-weighting system for a vertically adjustable table top.

As is well known, the force exerted by the typical tension spring varies linearly with its extension. Thus, if the first inch of extension of the spring requires a force of x, the second inch of extension requires 2x, the third inch of extension requires 3x and so on. If it is desired to employ the spring to provide a constant counter-weighting force, as is normally appropriate, some mechanism must be found to maintain the effective counter-weighting force constant despite the linearly increasing force exerted by the spring.

To this end, the art shows numerous mechanisms whereby a "snail cam" or similar device for continually decreasing the mechanical advantage of a lever is employed to convert the linearly increasing force exerted by a tension spring as it is extended to a constant force for counter-weighting moving assemblies. See, for example, the Haupt patent discussed above at FIG. 4, the Dobner patent at FIGS. 1 and 5, and the Laporte patent at FIG. 2.

The snail cam devices shown in the prior art for converting the linearly-increasing force exerted by a tension spring to be constant over a substantial range of extension of the spring typically require means for adjusting the preload on the spring. The prior art fails to teach satisfactory means for adjusting the spring preload. More particularly, in most circumstances when a device using a spring for counter-weighting purposes is assembled, the spring must be given an initial tension or preload to provide an initial force substantially equivalent to the load to be counter-weighted. Commonly a threaded member is provided to adjust the spring tension. As the threaded member is turned with respect to a tapped bore fixed to the structure of the device, the spring is gradually extended until the total force exerted by the spring is substantially equal to the load to be counter-weighted. See for example Bergenthal at 114; Haupt at column 2, lines 16–21; Rohrman at element 32, FIG. 5; Dobner at column 4, lines 35–38; and Laporte at column 3, lines 55–59.

Rouverol shows in FIGS. 14 and 15 the use of a spiral spring for exerting a variable force through the intermediation of a snail cam surface 238. Preload in this system is provided by loosening a bolt 250 securing the fixed end of the spring, moving the end of the spiral spring, and retightening the bolt; see column 11, lines 15–54.

It will thus be appreciated that the methods provided in the prior art for adjusting the preload or static force of springs used to provide counter-weighting force all require tools and are relatively complex. It would be preferable to provide a spring counter-weighting device including provision for simple compensation of variation in the load, not requiring tools for adjustment.

In addition to the devices shown in the patents discussed above, there are commercially available "tool balancers" comprising a housing supporting a sheave on which is wound a cable. The sheave is spring-loaded to exert a constant tension on the cable, approximating the weight of a tool supported by the cable, so that its user need not heft the weight of the tool throughout the workday. A wide range of such devices are offered, each intended for use with tools of particular weight. It would be desirable to provide a tool balancer adjustable to support tools of widely varying weights, not requiring tools for adjustment, so that a single tool balancer would be suitable for use with a range of tools.

One application of the load compensator of the invention is in connection with tables or desks having spring counter-weighting mechanisms for lifting the desk top vertically. More specifically, the present invention is directed to a load compensator for adjusting the counter-weighting force provided by a tension spring, for example, as weight is added to the table. Such tables are particularly desired for supporting computer equipment. Thus, for example, the table may be supplied with a spring preloaded to effectively counter-weight the basic mass of the table top and supporting structure, so that the table top can conveniently be raised and lowered as desired. The user may want to add a basic computer system and will need to adjust the spring force to insure that the height of the table top continues to be readily adjustable. He may then desire to add a printer or another heavy device. He may then find himself in the habit of keeping heavy books, lamps, etc. on his table top. The counter-weighting force must be adjusted in each case in order that the table top may be readily raised or lowered. The prior art discussed above does not provide a suitable manually operable mechanism for thus compensating for variation of the load in a spring counter-weighted mechanism, particularly one incorporating a snail cam for providing a constant counter-weighting force.

OBJECTS AND SUMMARY OF THE INVENTION

It is therefore an object of the invention to provide a simple and efficient mechanism incorporating a manually operable load compensator for converting linearly increasing spring force to a constant counter-weighting force and permitting convenient adjustment of the counter-weighting force without requiring the use of tools.

This object of the invention and others which will appear below are satisfied by the load compensator for a spring counter-weighting mechanism according to the invention, which comprises a snail cam for varying the leverage ratio applied by a tension spring to a device for applying a constant counter-weighting force. For example, the variable leverage ratio device may be a snail cam arranged for transmitting torque to a drum for winding a cable thereupon. The cable applies the counter-weighting force to the load to be counter-weighted. A spring applies tension to a second cable wrapped around the snail cam, arranged such that as the spring is extended the effective lever arm provided by the snail cam decreases; in this way, the net counter-weighting force provided to the drum is maintained substantially constant.

Adjustment of the total counter-weighting force provided by the tension member wrapped around the constant radius drum is effected by varying the initial position of the snail cam with respect to the drum. In the preferred embodiment, both the snail cam and the drum carrying the cable exerting the counter-weighting force are journaled for free rotation on a rotatable axle. An adjustment knob is mounted on one end of the axle. A pinion gear fixed to the axle engages a spur gear in a recess in one end of the drum. The spur gear engages an internal ring gear forming the inner circumference of the recess in the drum. The axle of the spur gear is fixed to the snail cam. Accordingly, when the adjustment knob is manually rotated, turning the pinion gear, the spur gear is also rotated, moving the static position of the snail cam with respect to the drum, and varying the lever arm ratio provided by the snail cam. Variation in the load can thus be compensated very simply and conveniently without the use of tools.

BRIEF DESCRIPTION OF THE DRAWINGS

The invention will be better understood if reference is made to the accompanying drawings, in which.

DESCRIPTION OF THE PREFERRED EMBODIMENT

Figure 1:
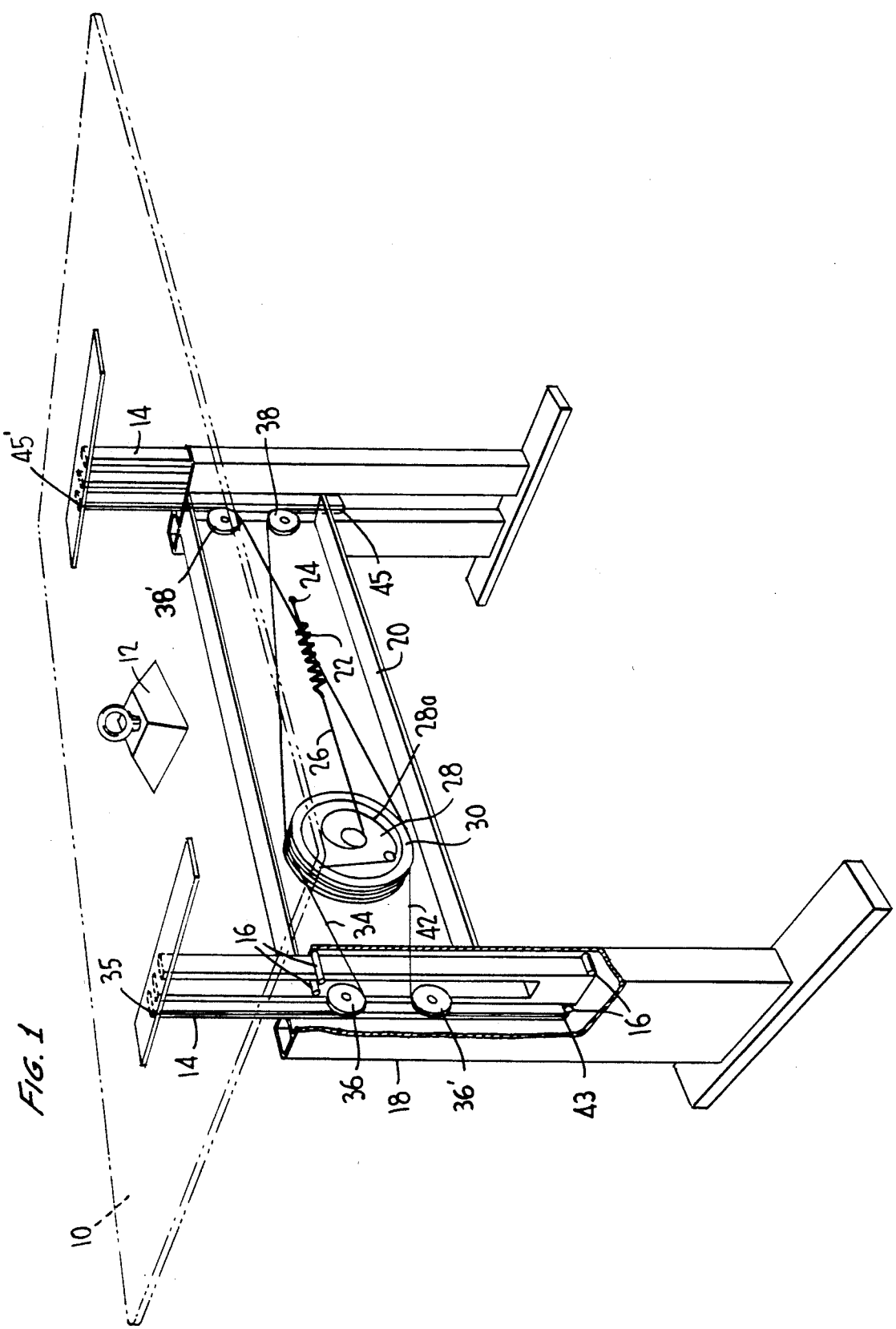
FIG. 1 is a simplified schematic perspective view of a desk or table including the load compensator according to the invention.
Figure 3:
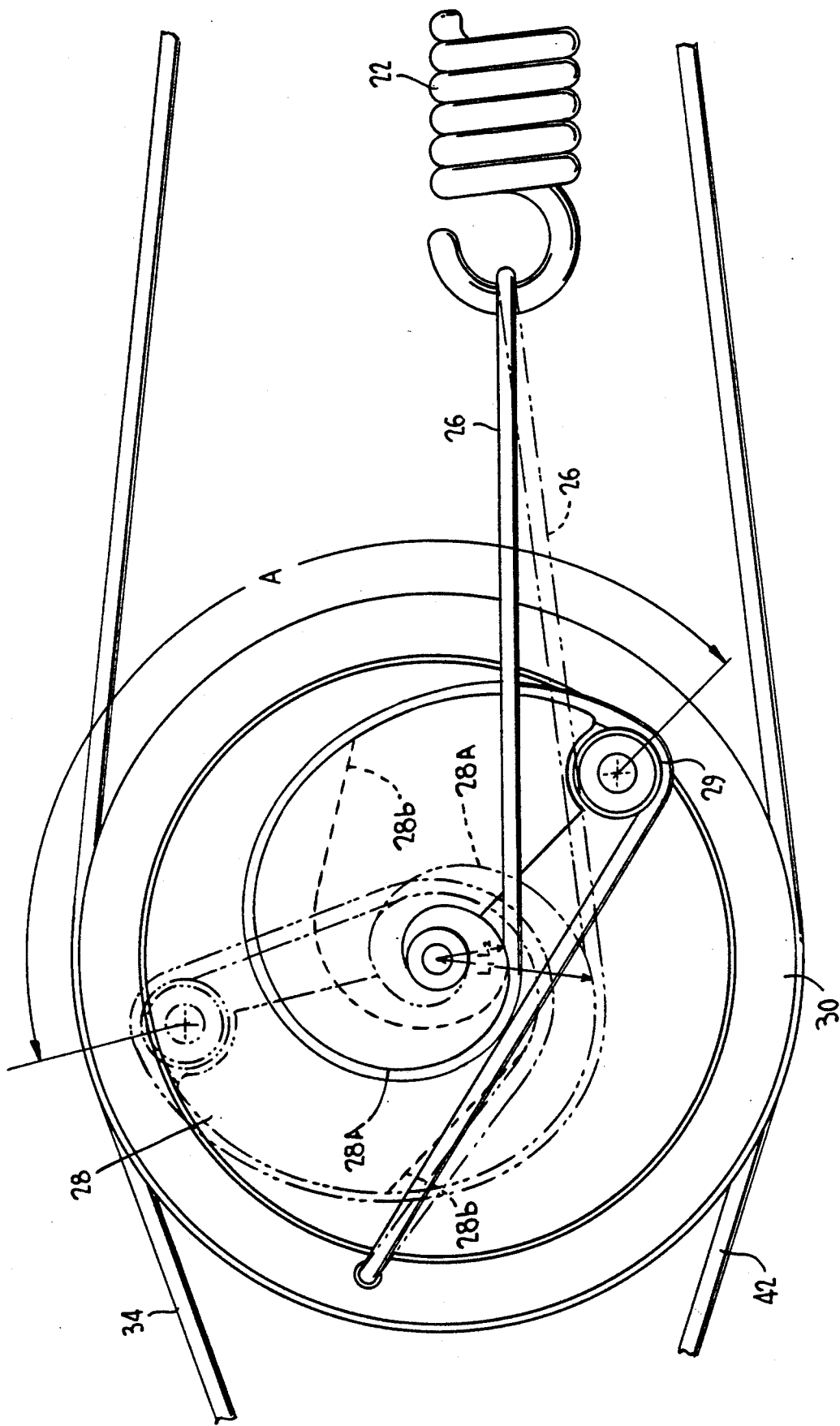
FIG. 3 is an elevational view of the assembly of the snail cam and the cable drum, showing the cam at two different positions with respect to the drum.

FIG. 1 is a schematic diagram of a table incorporating the improved load compensator of the invention. The table comprises a top 10 on which a variable load indicated at 12 may be placed. The table top 10 is supported at either lateral end by supports 14 moving vertically within guide members 16 mounted to legs 18 resting on the ground, allowing adjustment of the height of table top 10. A transverse beam 20 extends between and is fixed to the legs 18. In order to ease the labor of raising the table 10 with its load 12, a tension spring 22 extends between a fixed end secured to the beam 20 at 24 and a free end fixed to a flexible tension member 26, typically a vinyl coated steel cable. The steel cable 26 wraps around a snail cam 28 so as to meet a peripheral cam surface 28a at an effective distance L (FIG. 3) from the axis of the cam 28. The distance L, measured from the axis of the snail cam 28 to the point where cable 26 meets cam surface 28a, is thus the effective "lever arm" by which the spring force is applied to the cam 28. Cam 28 is formed such that cam surface 28a is disposed at a smoothly varying distance from the axis of cam 28. Thus, if the cam 28 is rotated clockwise in FIG. 1, so that the tension member 26 is wrapped further about peripheral cam surface 28a and further extending the spring 22, the effective lever arm length L decreases, such that the net torque (the product of the spring force multiplied by the effective lever arm length L) remains constant. Thus, FIG. 3 shows the cam at two positions, and illustrates at $L_1$ and $L_2$ the variation in L with rotation of the cam.

Torque imparted to the cam 28 by the spring 22 is transferred, to a drum 30. To this end, the end 26a of tension member 26 wrapped around cam 28 may be fixed to drum 30. See FIG. 4. Drum 30 may be two separate members joined to rotate as one, or may be formed as an integral member, as shown. A first flexible cable 34 extends from a fixed point 35 at one end of the table top 10 around a pulley 36, makes a complete wrap around the drum 30, passes over a second pulley 38 at the opposite end of the beam 20, and is fixed at 45, to the lower end of vertical support 14. Pulleys 36 and 38 rotate about axes fixed with respect to legs 18 and beam 20. A second cable 42 follows a generally opposite route, from a fixing point 43 at the lower end of the opposite vertical member 14, over a pulley 36' fixed to the beam 20, makes a complete wrap about drum 30, in the same direction as cable 34, passes over a further pulley 38' and is fixed to the table top 10 at 45'. Provision of such dual cooperative cables 34 and 42 ensures the table top moves evenly and smoothly.

It will thus be appreciated that if the table top 10 is raised, drum 30 is rotated counterclockwise in the view of FIG. 1. Tension imparted to tension member 26 by spring 22 tends to rotate drum 30, exerting tension on cables 34 and 42 so as to assist in raising the table top 10. Thus, spring 22 provides an effective counter-weighting force opposed to the weight of the table top 10, the load 12, and the vertical members 14, all of which must be lifted against the force of gravity to raise the table top. Accordingly, when the table top is raised, the spring 22 is shortened. Conversely, when the table top 10 is lowered, spring 22 is extended, storing energy to be employed in subsequently lifting the top 10.

As discussed above, tension spring 22 provides a tension increasing linearly as the spring is extended. However, the weight of the table top 10, load 12 and supporting structure 14 does not increase as the table is lifted. Therefore a constant force counter-weighting the mass of the moving elements is required. Accordingly, if the table top 10 is lowered, so that drum 30 rotates clockwise together with cam 28, winding cable 26 onto cam surface 28a and extending spring 22, the distance L from the axis of cam 28 to the point at which cable 26 meets cam surface 28a decreases, so that the net torque imparted to the cam 28 remains constant. Thus as the table top is lowered, rotating the cam 28 clockwise, spring 22 is stretched, and L decreases from $L_1$ to $L_2$ in FIG. 3. The net torque imparted by cam 22 to drum 30—the product of the spring force times L at any given point—remains constant. Conversely, when the table top is raised, such that the weight of the table top 10, load 12 and associated structure, including uprights 14 must be lifted against the force of gravity, spring 22 is shortened as its stored energy is released, assisting in lifting the table top. Accordingly, during raising of the table top 10, as cam 28 rotates clockwise and spring 22 is shortened, L increases from $L_2$ to $L_1$, such that the net torque exerted remains constant.

More generally, the counter-weighting force provided by spring 22 varies linearly with extension of the spring, and is converted to a constant force through the use of a tension member 26 wrapping around the periphery of a cam having a working surface 28a defining a varying effective lever arm L; the tension member and cam surface are arranged such that as the spring is extended, the effective lever arm L decreases (as the cam 28 is rotated clockwise in the view of FIG. 1), and vice versa. In this way a constant counter-weighting force is imparted to cables 34 and 42 to assist in raising the table 10 and associated load 12.

It will be appreciated that the table by its nature tends to have massive objects such as load 12 placed on its upper surface. To render the counter-weighting spring 22 fully useful, a load compensator must be provided to vary the amount of force imparted by the spring to tension member 26 and thence to cables 34 and 42. As discussed above, the prior art has normally altered the static force imparted by a spring to a tension member by adjusting its preload, typically by turning a threaded member fixed to one end of the spring and threaded through a nut or equivalent member fixed to the framework of the device. For example, according to the conventional prior art teaching, preload adjustment for spring 22 might be implemented by securing one end of spring 22 to a movable mount, the motion of the movable mount with respect to beam 20 being controlled by a lead screw arrangement or the like. See, for example, Laporte U.S. Pat. No. 4,351,245 wherein preload adjustment is provided by threaded member 44. Such adjustment of the spring preload using a threaded member requires the use of a wrench to exert the relatively substantial turning forces required. Some considerable time may be required to turn the screw sufficiently to counter-balance an additional load placed on the table.

Figure 2:
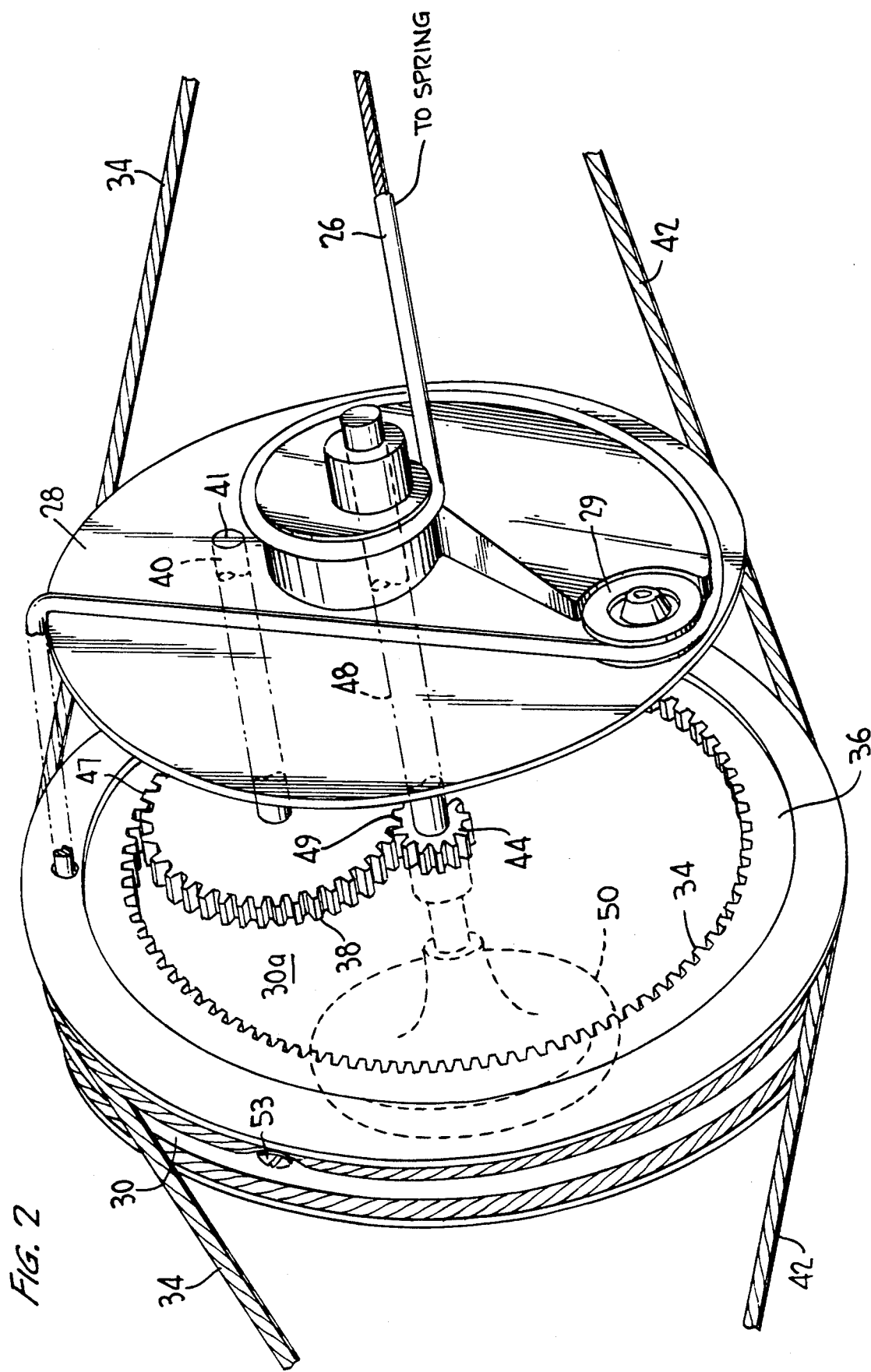
FIG. 2 is a detailed exploded perspective view of the assembly of the snail cam and the cable drum.
Figure 4:
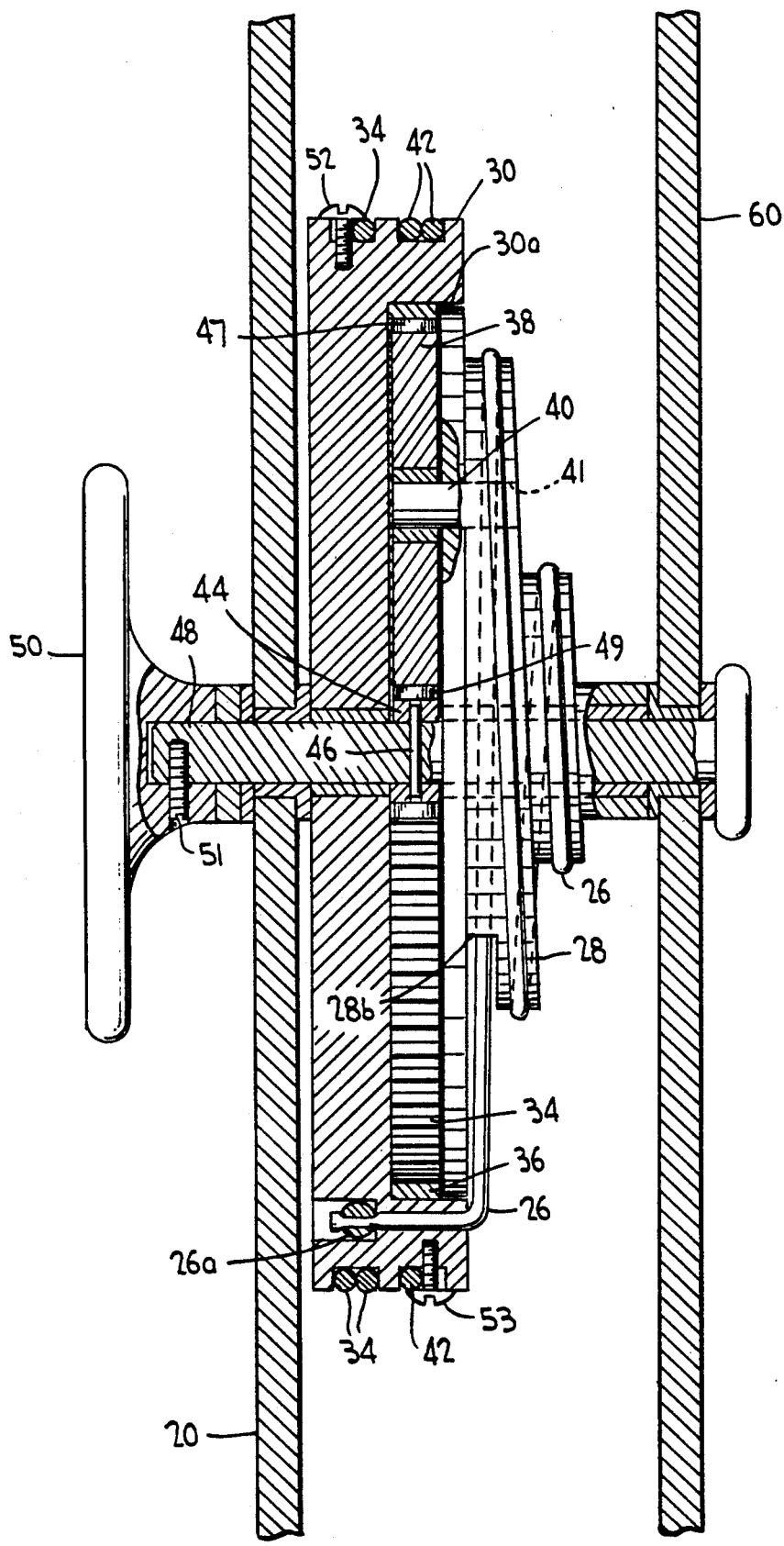
FIG. 4 is a cross-sectional view taken through the axle on which the drum and snail cam are mounted.

The improved method for adjusting the amount of force applied by the spring to the tension member 26 provided according to the invention is shown in FIGS. 2 and 4. FIG. 2 is an exploded view generally corresponding to the orientation of FIG. 1 and illustrating the mechanism used for adjusting the relative position of the snail cam 28 with respect to the drum 30. FIG. 4 is a cross-section through axle 48.

As shown in FIGS. 2 and 4, a recess 30a is provided in outer face of drum 30. The inner peripheral surface of recess 30a is provided with gear teeth 34, e.g., by assembling a separate ring gear 36 to the interior of the drum 30; equivalently, the gear teeth 34 may be formed integrally with the drum 30 in a molding operation. A spur gear 38 confined within recess 30a by snail cam 28 meshes at 47 with the teeth 34. Spur gear 38 is journaled for free rotation about a stub axle 40 fixed in a bore 41 in the snail cam 28. A pinion gear 44 meshing with spur gear 38 at 49 is fixed as indicated by key 46 in FIG. 4 to the axle 48 on which are journaled the drum 30 and the cam 28. That is, the pinion gear 44 is fixed to and rotates with the axle 48, while the drum 30 and the snail cam 28 each pivot freely with respect to the axle 48. A load compensating adjustment knob 50 is keyed to the axle 48 by key 51 on the outer side of the transverse beam 20, and can be manually operated to turn the axle 48. The distal end of axle 48 may be supported by member 60 fixed to beam 20 (FIG. 4). Screws 52, 53 prevent slippage of cables 34 and 42 with respect to drum 30. Bearing 29 prevents kinking of cable 26.

When the knob 50 is turned, rotating axle 48, pinion gear 44 accordingly rotates, turning spur gear 38. As spur gear 38 is journaled to rotate freely with respect to stub axle 40, spur gear 38 is driven along the teeth of ring gear 34. As stub axle 40 is fixed within bore 41 of cam 28, rotation of axle 48 by knob 50 causes snail cam 28 to be rotated with respect to drum 30. As snail cam 28 is thus rotated, tension member 26 is wound (or unwound) from cam surface 28a, varying the distance L between the point on surface 28a at which member 26 meets surface 28a and the axis of cam 28, and thus varying the effective length L of the lever arm whereby the linearly varying tension provided by spring 22 is converted to constant torque applied to snail cam 28.

Rotating knob 50 thus varies the respective radial positions of cam 28 and drum 30, varying the constant counter-weighting force provided by cables 34 and 42. Rotation of knob 50 moves the cam between the positions shown in FIG. 3, varying the effective lever arm length from $L_1$ to $L_2$, or vice-versa, depending on whether the counter-weighting force is to be increased or decreased. Rotation of cam 28 with respect to drum 30 thus does not normally involve extension of spring 22 to vary the force exerted on the load; variation in L accomplishes this end. In order that cam 28 can be rotated with respect to the drum 30 to a considerable degree, as indicated by angle A in FIG. 3, without extending spring 22, the rear of cam 28 is relieved radially at 28b.

As noted, load compensation may be accomplished according to the invention without extension or compression of spring 22. Accordingly, the mechanical advantage provided by spur gear 38 is sufficient that no great strength is required to turn knob 50, and so that no tools or the like are required. Use of the phrase "manually operable" in the appended claims thus indicates that no tools or the like are required in order to adjust the counter-weighting force. If the table is subsequently raised or lowered (simply by gripping its edges and lifting or lowering it, as desired) the spring provides a corresponding constant counter-weighting force. Friction then retains the table top in the desired position, or gripping lock mechanisms may be provided, for example, locking the supports 14 to the legs 18.

It will be appreciated that while the invention has been described in connection with counter-weighting a table top, it may have many other uses. For example, a spring counter-weighting mechanism including the load compensating adjustment feature of the invention may be employed as a "tool balancer" that is readily adjustable to provide varying tension on a cable, to support a wide variety of tools. A spring counter-weighting mechanism with the load compensating adjustment feature of the invention may be employed as a load in an exercise machine; in this case the load compensator would provide a convenient means for adjusting the resistance experienced by the athlete in exercising, while the snail cam would provide a constant resistance to be overcome in performance of the exercise. Alternatively, the cam could be reshaped to provide a load varying to suit particular biomechanical requirements. Many other uses of the invention may be made.

Further, it will be appreciated that numerous other embodiments of the invention are within its essential spirit and scope. For example, while a pair of cables wrapped about a drum is a convenient way to translate torque from snail cam 28 into a constant counter-weighting force, other methods are satisfactory for doing so. In essence, the drum acts simply as a fixed-radius lever arm for translating torque applied by the cam 28 about the axle 48 to tension on cables 34 and 42. Tension spring 22 could be replaced with a compression spring. Moreover, other manually operable devices for varying the respective radial positions of the snail cam 28 and drum 30 are considered to be within the invention, where not excluded by the following claims.

Therefore, inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A load compensator for a spring counter-weighting mechanism, said counter-weighting mechanism comprising:

a spring arranged to exert tension on a tension member, said tension varying linearly with extension of said spring;

a snail cam journaled for rotation about an axis and comprising a cam surface for receiving said tension member, said cam surface effectively spacing the point at which said tension member contacts said cam surface from said axis by a radial distance varying continuously radially about said snail cam, such that a net torque applied to said snail cam due to tension applied to said tension member by said spring varies with respect to the point at which said tension member contacts said cam surface; and fixed-radius lever arm means pivotable about an axis and adapted to receive torque exerted on said snail cam by said tension member and to transfer said torque from said snail cam to means for exerting a constant counter-weighting force on a load to be counter-weighted;

said load compensator comprising means for controllably varying the relative radial positions of said snail cam with respect to said lever arm means.

2. The load compensator of claim 1, wherein said lever arm means and said snail cam are coaxially mounted for free rotation on a single first axle, said first axle being journaled for rotation with respect to a fixed frame member, and said means for controllably varying the relative positions of said snail cam and said lever arm means comprising a pinion gear fixed to said axle effectively engaging gear teeth fixed to said lever arm means, and a manually operable means for turning said axle with respect to said snail cam and lever arm means, whereby said snail cam may be controllably rotated with respect to said lever arm means.

3. The load compensator of claim 2, wherein said pinion gear engages a spur gear engaging gear teeth fixed to said lever arm means.

4. The load compensator of claim 3, wherein said spur gear is engaged by said pinion gear and by an internally-toothed ring gear, said ring gear comprising said gear teeth fixed to said lever arm means.

5. The load compensator of claim 4, wherein said spur gear is journaled to rotate freely about a stub axle, said stub axle being fixed to said snail cam at a point radially spaced from said first axle, whereby rotation of said pinion gear drives said spur gear around said internally toothed ring gear, rotating said snail cam with respect to said lever arm means.

6. The load compensator of claim 4, comprising a grippable handle fixed to said first axle to facilitate rotation of said pinion gear and consequent rotation of said snail cam with respect to said lever arm means.

7. The load compensator of claim 4, wherein said lever arm means is a drum supported for free rotation on said first axle, and said internally-toothed ring gear is mounted to said drum.

8. The load compensator of claim 7, wherein said means for exerting a constant counter-weighting force comprises at least one flexible tension member extending at least partially around said drum.

9. The load compensator of claim 1, wherein said tension member is a flexible cable wrapped around said snail cam along said cam surface, one end of said cable being fixed to said spring.

10. The load compensator of claim 9, wherein the other end of said cable is anchored to said lever arm means to transfer torque from said snail cam to said lever arm means.

11. Counter-weighting mechanism for counter-weighting a load movable vertically with respect to a fixed member, comprising:

a spring secured at one end with respect to said fixed member;

a snail cam freely pivoting about a first pivot axis fixed to said fixed member, said snail cam comprising a spiral cam surface disposed at a smoothly varying radial distance from said axle;

a drum freely pivoting about a second pivot axis fixed to said fixed member;

means for transmitting torque from said snail cam to said drum;

means for transmitting a constant counter-weighting force from said drum to said load;

flexible tension means fixed at one end with respect to a second end of said spring, and adapted to be wrapped about said snail cam so as to rest on said spiral cam surface to exert torque on said snail cam; and manually operable means for altering the relative radial positions of said snail cam with respect to said drum, whereby said constant counter-weighting force may be altered without the use of tools.

12. The mechanism of claim 11, wherein said drum and said snail cam are coaxially supported for free rotation about a single axle, whereby said first and second pivot axes coincide.

13. The mechanism of claim 12, wherein a pinion gear is fixed to said axle, said pinion gear effectively engaging gear teeth fixed to at least one of said drum and said snail cam, whereby rotation of said axle alters the relative radial positions of said snail cam and said drum.

14. The mechanism of claim 13, wherein said manually operable means comprises a manually grippable handle fixed to said axle for rotating said axle with respect to said fixed member.

15. The mechanism of claim 13 wherein said pinion gear engages a spur gear, and said spur gear engages internal teeth fixed to said drum, whereby rotation of said pinion gear is effective to cause said spur gear to pivot about said axle and to alter the relative radial positions of said drum and said snail cam.

16. The mechanism of claim 15, wherein said spur gear is received in a recess formed in one end of said drum, said internal teeth of said ring gear forming the circumferential inner surface of said recess.

17. The mechanism of claim 15, wherein a stub axle is fixed to the center of said spur gear, said stub axle extending through a bore in said snail cam spaced radially from said first axle.

18. The mechanism of claim 11, wherein said load comprises a table top and supporting structure, and said fixed member comprises a stationary transverse frame member of said table extending horizontally between laterally spaced legs of said table.

19. The mechanism of claim 18, wherein said drum and said snail cam rotate freely about an axle extending horizontally from and rotating with respect to said transverse frame member.

20. The mechanism of claim 19, wherein said means for transmitting a constant counter-weighting force from said drum to said load comprises at least one flexible cable wrapped around and secured to said drum and fixed at one end to said table top and at the other to a vertically extending table top support member, said cable passing over pulleys fixed to said frame of said table, such that torque exerted on said drum responsive to force exerted on said snail cam by said spring and transmitted from said snail cam to said drum tends to urge said table top upwardly.

21. The mechanism of claim 20, wherein two such flexible cables are provided, one end of each being fixed to said table top at opposite lateral sides thereof and the other end of each being fixed to vertically extending structure supporting said table top at opposite lateral ends thereof, said cables being wrapped upon said drum so as to move cooperatively upon rotation of said drum to raise said table top equally at both lateral ends.

22. The mechanism of claim 11, wherein said spring is a tension spring.

* * * * *